(12) United States Patent
Lis et al.

(10) Patent No.: US 12,450,653 B2
(45) Date of Patent: Oct. 21, 2025

(54) FIRM TRADE PROCESSING SYSTEM AND METHOD

(71) Applicant: The Clearing Corporation, Chicago, IL (US)

(72) Inventors: Benjamin Lis, New York, NY (US); Francois Lepart, London (GB)

(73) Assignee: The Clearing Corporation, Chicago, IL (US)

( * ) Notice: Subject to any disclaimer, the term of this patent is extended or adjusted under 35 U.S.C. 154(b) by 316 days.

(21) Appl. No.: 13/952,866

(22) Filed: Jul. 29, 2013

(65) Prior Publication Data

US 2014/0040097 A1 Feb. 6, 2014

Related U.S. Application Data

(60) Provisional application No. 61/677,833, filed on Jul. 31, 2012.

(51) Int. Cl.
 *G06Q 40/04* (2012.01)
(52) U.S. Cl.
 CPC ................................. *G06Q 40/04* (2013.01)
(58) Field of Classification Search
 CPC ...... G06Q 40/06; G06Q 30/02; G06Q 10/063; G06Q 40/04; G06Q 40/00; G06Q 10/04; G06Q 30/0201; H04L 12/5835; H04L 12/585; H04L 51/066; H04L 51/043; H04L 67/02; H04L 69/329; G06F 9/4428; G06F 17/30; G06F 12/0868; G06F 17/30395; G06F 17/30563; G06F 17/30569; G06F 9/541; G06F 9/54; G06F 11/1469; G06F 8/38; G09G 5/393; G05B 2219/32126; G05B 2219/32129; G05B 2219/32153

See application file for complete search history.

(56) References Cited

U.S. PATENT DOCUMENTS

| | | | |
|---|---|---|---|
| 6,374,305 B1 * | 4/2002 | Gupta | H04L 67/04 709/246 |
| 8,009,619 B1 * | 8/2011 | Clavel | H04L 67/04 370/329 |
| 8,301,548 B1 * | 10/2012 | Waelbroeck et al. | |

(Continued)

FOREIGN PATENT DOCUMENTS

| WO | 01/61602 A1 | 8/2001 |
|---|---|---|
| WO | 01/80846 A2 | 11/2001 |
| WO | 2009/093243 A2 | 7/2009 |

OTHER PUBLICATIONS

Implementing OTC Derivtives market Reforms by FSB (financial Stability Board); Oct. 23, 2010; 73 pages.*

(Continued)

*Primary Examiner* — Christine M Behncke
*Assistant Examiner* — Mary M Gregg
(74) *Attorney, Agent, or Firm* — DLA Piper LLP (US)

(57) ABSTRACT

A method for processing a trade, the method includes a computer generating a firm trade between two clearing participants. The method further includes transmitting the firm trade enrichment request to the clearing participants, and receiving enriched firm trade in response. The method further includes processing the firm trade as a cleared trade (Continued)

using the received enriched firm trade data. The method further includes submitting the firm trade to a trade reporting repository.

19 Claims, 1 Drawing Sheet

(56) References Cited

U.S. PATENT DOCUMENTS

| | | | | |
|---|---|---|---|---|
| 8,595,186 | B1* | 11/2013 | Mandyam | G06F 8/38 |
| | | | | 717/178 |
| 8,924,407 | B2* | 12/2014 | Gomadam | G06F 17/30303 |
| | | | | 707/610 |
| 9,542,434 | B2* | 1/2017 | Gomadam | G06F 17/30303 |
| 2002/0018487 | A1* | 2/2002 | Chen | G06F 9/54 |
| | | | | 370/479 |
| 2002/0083072 | A1* | 6/2002 | Steuart | G06F 17/30569 |
| 2006/0041605 | A1* | 2/2006 | King | G06F 17/30011 |
| 2008/0021758 | A1 | 1/2008 | Teichmann et al. | |
| 2009/0307123 | A1* | 12/2009 | Gershon | |
| 2010/0005030 | A1* | 1/2010 | DePetris et al. | |
| 2010/0010906 | A1* | 1/2010 | Grecia | G06Q 40/00 |
| | | | | 705/40 |
| 2010/0138334 | A1* | 6/2010 | Warsaw | G06Q 40/04 |
| | | | | 705/37 |
| 2012/0078775 | A1* | 3/2012 | Callahan | |
| 2012/0323947 | A1* | 12/2012 | Bice | G06F 17/3043 |
| | | | | 707/760 |

OTHER PUBLICATIONS

Trade Enrichment; by Financial Express; 4 pages; Jul. 25, 2010.*
ISDA; proposed rule: trade acknowldegment and verification of security based swap transactions (file No. S7-03-11); by Murphy; 10 pages; Feb. 22, 2011.*
The Common Communication Interface (CCI) by Atchley (Year: 2011).*
Singapore Search Report and Written Opinion mailed Nov. 19, 2014 for Singapore Application No. 2013058250.
"Enrichment Process Flow" SAP, retrieved from the Internet on Nov. 18, 2014 under URL:<http://help.sap.com/saphelp_nwmdm71/helpdata/en/44/ab743565d37455e10000000a11466f/content.htm>.

* cited by examiner

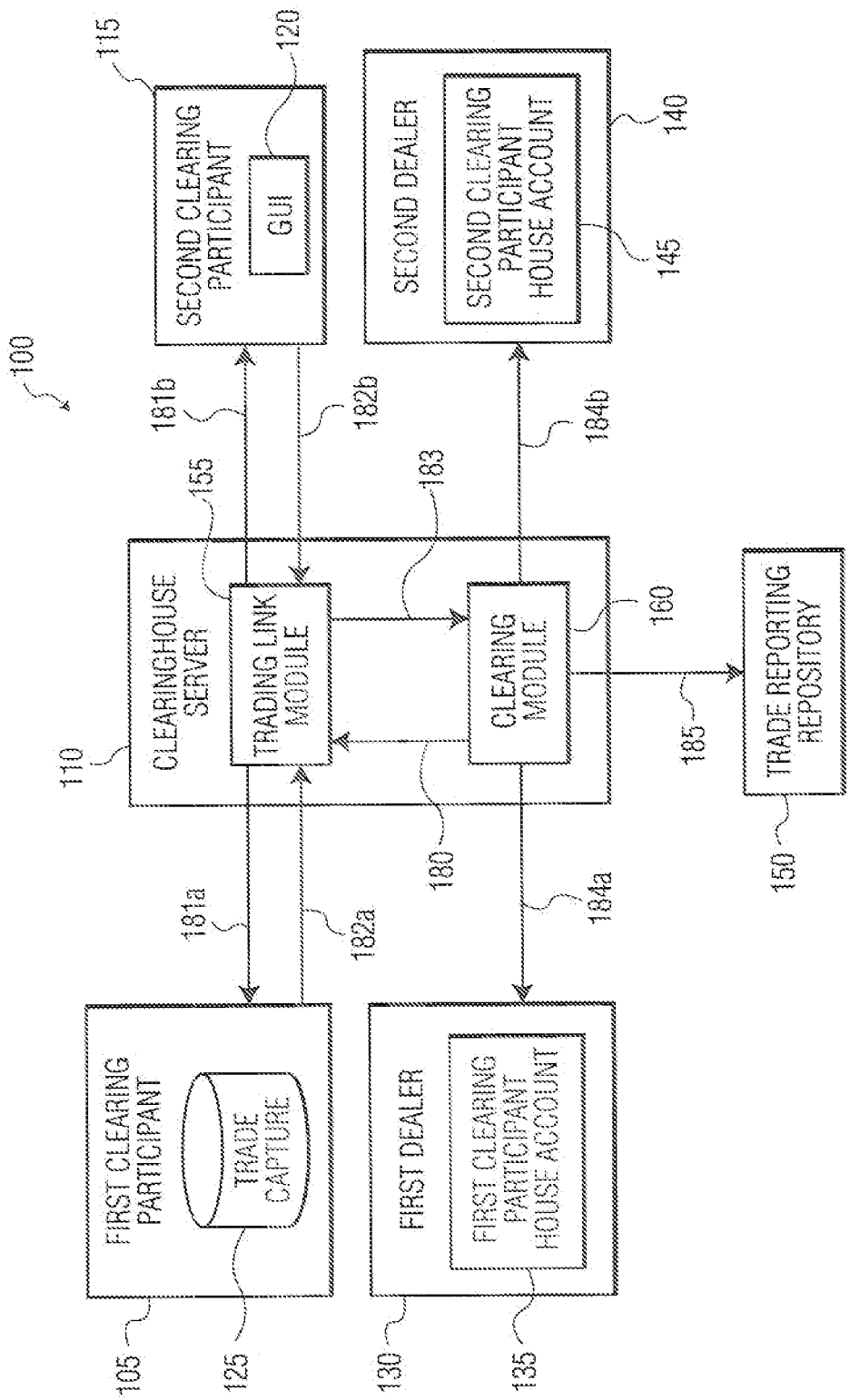

FIRM TRADE PROCESSING SYSTEM AND METHOD

TECHNICAL FIELD

This disclosure is generally related to processing, clearing and recording firm trades between clearing participants, and more particularly to computer systems and methods for identifying and clearing firm trades generated by a price discovery process.

BACKGROUND

Recent developments in derivatives trading markets have created a need to trade a wide variety of financial instruments and derivatives that are not traded on traditional exchanges. In particular, a large number of financial instruments are currently traded in Over-The-Counter (OTC) markets. These trades need to comply with current legislation and financial regulations, especially those that are currently booked as bilateral trades. Consequently, it is highly desirable to have a new type of a trading system that is capable of identifying and processing firm trades in a way that avoids processing any of these trades as a bilateral trade between two clearing participants.

SUMMARY

The present disclosure relates generally to a method and a system for processing trades. In one embodiment, an at least one computer may generate a firm trade between clearing participants. The at least one computer may then transmit a firm trade enrichment request to the clearing participants, and receive enriched firm data in response. The at least one computer may then process the firm trade as a cleared trade using the enriched firm data, and submit the trade to a trade reporting repository.

In another embodiment, a clearinghouse server may be configured to generate a firm trade between clearing participants. The clearinghouse server may further be configured to transmit a firm trade enrichment request to the clearing participants, and receive enriched firm data in response. The clearinghouse server may also be configured to process the firm trade as a cleared trade using the enriched firm data, and submit the trade to a trade reporting repository.

BRIEF DESCRIPTION OF THE DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings:

FIG. 1 is a block diagram illustrating an exemplary system and method for processing a trade.

DETAILED DESCRIPTION

The present disclosure relates generally to systems and methods of generating and processing trades as cleared trades. After a firm trade is generated, a request to enrich the trade may be sent to the trade counterparties. Once the firm trade enrichment data is received, the trade may be processed as a cleared trade with each counterpart facing a clearinghouse entity directly. The firm trades may then be submitted to trade reporting repository.

For purposes of this disclosure, a firm trade shall refer to any actual trade between two or more clearing participants or other trade participants that is subject to being executed and cleared. The firm trade may also refer to an actual trade between a clearing participant and a clearinghouse entity. In one embodiment, a firm trade may refer to a trade that is generated as a result of a price discovery process. In another embodiment, a firm trade may be generated based on one or more trade submissions from clearing participants.

For purposes of this disclosure, price discovery process shall refer to any manner of determining a price of a financial instrument based on proposed trade submissions by trading parties. In one embodiment, clearing participants may be required to submit hypothetical trade proposals for certain OTC financial instruments. The hypothetical trade proposals may then be processed to determine the price of these OTC financial instruments. In one embodiment, the price is determined by using a mathematical algorithm. Additionally, to ascertain that no misleading hypothetical trade proposals are submitted, the clearing participants may occasionally be required to execute some of the submitted hypothetical trades as firm trades.

For purposes of this disclosure, the clearing participant shall refer to any organization or entity that is authorized to clear trades. The clearing participant may be authorized to clear trades from its own accounts and/or trades that were conducted on behalf of its clients. The clearing participant may also refer to any entity such as a broker, dealer, or other trade participant that may submit trade proposals (e.g. bids or offers) that may result in actual trades that may ultimately be processed as cleared trades according to this disclosure.

For purposes of this disclosure, the trade participant shall refer to any person, organization or entity that can submit trade proposals or otherwise engage in trading of financial instruments. In one embodiment, the trade participant may be a clearing participant.

The term clearinghouse server refers to any type of a computing device. The clearinghouse server may comprise one or more processors configured to execute instructions stored on a non-transitory memory configured to provide any type of clearing, trading or other services. A clearinghouse server may be embodied on a single computing device, while in other embodiments, a clearinghouse server device may refer to a plurality of computing devices housed in one or more facilities that are configured to jointly provide local or remote computing services to one or more users or user devices. The clearinghouse server may send and receive data from trade participant computing devices, clearing participant computer devices, dealer computing devices, trade reporting repositories, or any other type of computing device or entity over the Internet, over a Wi-Fi connection, over a cellular network or via any other wired or wireless connection or network known in the art.

The term computer refers to any type of a computing device. The computer may comprise one or more processors configured to execute instructions stored on a non-transitory memory configured to provide any type of computing services. A computer may be embodied on a single computing device, while in other embodiments, a computer may refer to a plurality of computing devices housed in one or more facilities that are configured to jointly provide local or remote computing services to one or more users or user devices.

Trade Processing Method

In a first exemplary implementation, the present disclosure relates to a method of processing a trade by a computer.

In one embodiment, the computer may be a clearinghouse server. As an initial step, the method includes the computer generating an at least one firm trade involving one or more trade participants. In one embodiment, the one or more trade participants associated with the firm trade are clearing participants. In another embodiment, the computer may generate a firm trade based on the results of a price discovery process. For example, the price discovery process may involve receiving theoretical trade submissions from multiple clearing participants that reflect their views on the price of a particular financial instrument. The financial instrument may be a Credit Default Swap (CDS), a swap, an option, an option chain, a future, a forward or any other financial instrument traded in OTC markets or other markets. Some of the theoretical trade submissions may then be converted to firm trades. In one embodiment, the trades may be selected for conversion randomly by crossing and locking matching theoretical bids and offers received from the clearing participants. However, other methods may be also used to identify the firm trade. In yet another embodiment, the theoretical trade submissions may be used to calculate a theoretical price for a given financial instrument. The theoretical price may be calculated using a mathematical algorithm with theoretical trade submissions used as inputs. The theoretical price may then be used to assess risk associated with trading a given financial instrument and/or to determine appropriate margins for parties that wish to trade this financial instrument.

Once the computer generates a firm trade, the computer may generate and transmit a firm trade notification to the trade participant counterparties associated with the firm trade. The firm trade notification may be straight-through processed to the trade participants using an Application Programming Interface (API) associated with the computer. In another embodiment, the firm trade notification may be send in a Comma-Separated Format (CSV) format, or anther suitable format. The firm trade notification may include a request for firm trade enrichment data.

The trade participants may then respond by providing the firm trade enrichment data. The firm trade may be enriched by a trading participant using a graphical user interface (GUI). In another embodiment, the firm trade may be enriched automatically by a trade participant's computing device using the API provided by the computer or associated with the computer. The enriched film trade data may then be transmitted to the computer. In one embodiment the enriched firm data may comprise trade identification data and desk identification data associated with the trade participant. In other embodiments, other data may also be included in the enriched firm trade data.

Once the computer receives the enriched firm trade data, the computer may process the firm trade as a cleared trade using the received enriched firm trade data. In another embodiment, if the enriched firm trade data is not received by a certain time (e.g. 6 PM of the trade day) the computer may generate and/or use default values as enriched firm trade data. In one embodiment, the firm trade is processed as a cleared trade by sending appropriate messages to dealers associated with the trade participants. However, other methods of processing a firm trade as a cleared trade known in the art may also be used.

Once the firm trade is processed as a cleared trade, the computer may submit the firm trade to a trade reporting repository on behalf of the trade participants. In one embodiment, the firm trade is submitted via an Automated New Trade process. However, other methods of submitting the firm trade known in the art may also be used.

In one embodiment, the firm trade is processed by a clearinghouse server with each of the trade participants Facing the clearinghouse entity directly as a respective counterparty. In this embodiment, the firm trade is not processed as a bilateral trade between the two trade participants. Instead, the firm trade may be processed as one trade between a first trading participant and the clearinghouse entity and a second trade between a second trading participant and the clearinghouse entity. This embodiment may be particularly useful for trade participants who are Futures Commission Merchants (FCMs) that are defined as Derivative Clearing Organizations (DCOs) to comply with financial legislation and regulations. In case the clearinghouse server rejects the firm trade, the firm trade may be considered null and void for all parties.

Clearinghouse Server

In a second exemplary implementation, a clearinghouse server may be configured to process a firm trade. The clearinghouse server may comprise one or more processors configured to execute instructions stored on a non-transitory memory. Execution of these instructions may cause the clearinghouse server to perform any of the features described below.

The clearinghouse server may be configured to generate at least one firm trade involving one or more trade participants. In one embodiment, the one or more trade participants are clearing participants. In another embodiment, the clearinghouse server may be configured to generate a firm trade based on the results of a price discovery process. For example, the clearinghouse server may be configured to conduct a price discovery process by receiving theoretical trade submissions from multiple clearing participants that reflect their views on the price of a particular financial instrument. The clearinghouse server may be configured to convert some of the theoretical trade submissions to firm trades. In one embodiment, the clearinghouse server may be configured to selected trades for conversion randomly by crossing and locking matching theoretical bids and offers received from the clearing participants. In yet another embodiment, the clearinghouse server may be configured to use theoretical trade submissions to calculate a theoretical price for a given financial instrument. The theoretical price may then be used to assess risk associated with trading a given financial instrument and/or to determine appropriate margins for parties that wish to trade this financial instrument.

The clearinghouse server may be configured to generate and transmit a firm trade notification to the trade participant counterparties associated with the firm trade after converting a trade submissions to a firm trade. The clearinghouse server may also be configured to straight-through process the firm trade notification to the trade participants using an API associated with the clearinghouse server. In another embodiment, the clearinghouse server may be configured to send the firm trade notification in a Comma-Separated Format (CSV) format, or another suitable format. The firm trade notification may include a request for firm trade enrichment data.

One or more user computing devices associated with the trade participants may be configured to respond by proving the enriched firm trade data. The trade may be enriched by a user computing device through a graphical user interface (GUI) provided by the clearinghouse server. In one embodiment, the graphical user interface may be configured to display the economic details of the firm trade and the identities of the firm trade counterparties. In another embodiment, the GUI may be configured to display the clearinghouse entity as the counterparty, and not to display the identity of the crossed and locked counterparty. In yet another embodiment, a user computing device may be configured to enrich the firm automatically using an API provided by the clearinghouse server. The user computing device may be configured to transmit the enriched trade data to the clearinghouse server. In one embodiment, the enriched trade data may comprise trade identification data and desk identification associated with the trade party.

The clearinghouse server may be configured to receive the enriched trade data and process the firm trade as a cleared trade using the received enriched firm trade data. In another embodiment, the clearinghouse server may be configured to generate and/or use default values as enriched firm trade data if the enriched firm trade data is not received by a certain time (e.g. 6 PM of the trade day). In one embodiment, the clearinghouse server may be configured to process the firm trade as a cleared trade by sending appropriate messages to dealers associated with the trade participants. However, other method of processing a firm trade as a cleared trade known in the art may also be used.

In one embodiment, the clearinghouse server is configured to processed the firm trade with each of the trade participants facing the clearinghouse entity directly as a respective counterparty. In this embodiment, the clearinghouse server is not configured to process the firm trade as a bilateral trade between the two trade participants. Instead, the clearinghouse server is configured to process the firm trade as one trade between a first trading participant and the clearinghouse entity and a second trade between a second trading participant and the clearinghouse entity. This embodiment may be particularly useful for trade participants who are Futures Commission Merchants (FCMs) that are defined as Derivative Clearing Organizations (DCOs). In case the clearinghouse server rejects the firm trade, the firm trade may be considered null and void for all parties.

Once the firm trade is processed as a cleared trade, the clearinghouse server may be configured to submit the firm trade to a trade reporting repository on behalf of the trade participants. In one embodiment, the clearinghouse server may be configured to submit the firm trade an Automated New Trade process. However, other methods of submitting the firm trade known in the art may also be used.

Trading System

Turning now to FIG. 1, an exemplary system 100 for processing a trade is shown. The system 100 comprises a clearinghouse server 110, a first clearinghouse participant 105, a second clearinghouse participant 115, a first dealer 130, a second dealer 140 and a trade reporting repository 150. Each of the clearinghouse server 110, the clearinghouse participants 105 and 115, the dealers 130 and 140 and the trade reporting repository 150 may comprise one or more computing devices that include a non-transitory memory for storing instructions and a processor for executing the instructions. The clearinghouse server 110 may send and receive data from clearing participants 105 and 110, dealers 130 and 140, and trade reporting repository 150 over the Internet, over a Wi-Fi connection, over a cellular network or via any other wired or wireless connection or network known in the art.

The clearinghouse server 110 may comprise a clearing module 160 and a trading link module 155. The clearing module 160 and the trading link module 155 may be embodied on separate computing devices housed in separate facilities. In another embodiment, the modules 155 and 160 may be embodied on a single computing device that comprises one or more processors configured to execute instructions stored on a non-transitory memory. Execution of these instructions may cause the clearinghouse server 110 to perform the functions of the clearing module 160 and the trading link module 155. The modules 160 and 155 may communicate with one another over the Internet, over as Wi-Fi connection, over a cellular network or via any other wired or wireless connection or network known in the art. Alternatively, the modules 160 and 155 may communicate with one another using internal capabilities of a single computing device.

The clearing module 160 may be configured to generate a firm trade with the first clearing participant 105 and the second clearing participant 115 being crossed and locked counterparties. The clearing module 160 may be configured to generate this firm trade as a result of a price discovery process discussed above. In other embodiments, the clearing module 160 may be configured to generate the firm trade using other methods or techniques known in the art. The clearing module 160 may also be configured to transmit the firm trade to other modules of the clearinghouse server 110 or to other elements of the system 100. In one embodiment, the clearing module 160 may be configured to request and receive firm trade enrichment data from the trade link module 155. In another embodiment, the firm trade enrichment data may comprise desk identification data and trade identification data provided by the first clearing participant 105 and/or the second clearing participant 115. In yet another embodiment, the clearing module 160 may be configured to generate default values for the firm trade enrichment data, if the firm trade enrichment data is not received from the clearing participants 105 and 115 by designated time.

The clearing module 160 may also be configured to process the firm trade as a cleared trade. In one embodiment, the clearing module 160 is configured to process the firm trade in two sub-steps. In the first sub-step, the clearing module 160 may be configured to process the firm trade with the first clearing participant 105 and the clearinghouse as the respective counterparties. In the second sub-step, the clearing module 160 may be configured to process the firm trade with the second clearing participant 115 and the clearinghouse as the respective counterparties. In this embodiment, the firm trade is not processed as a bilateral trade between the first clearing participant 105 and the second clearing participant 115.

In one embodiment, the clearing module 160 may process the firm trade as a cleared trade by transmitting appropriate data to the first dealer 130 and the second dealer 140, where the dealers 130 and 140 comprise the accounts 135 and 145, respectively, associated with the respective clearing participants 105 and 155. In other embodiments, the clearing module 160 may process the firm trade as a cleared trade by other methods or techniques known in the art. The clearing module 160 may also be configured to submit the firm trade to the trade reporting repository 150 once the firm trade is processed as a cleared trade.

The trading link module 155 may be configured to receive the firm trade data from the clearing module 160. The trading link module 155 may further be configured to transmit the firm trade data to the first clearing participant 105 and the second clearing participant 115, where the clearing participants 105 and 115 are counterparties in the firm trade. The trading link module 155 may be configured to straight-through process the firm trade data to the first clearing participant 105. The link module 155 may be also be configured to transmit the data to be displayed on the graphical user interface (GUI) 120 of the second clearing participant 115. The trading link module 155 may further be configured to request firm trade enrichment data from the clearing participants 105 and 115. In one embodiment, the trading link module 155 may be configured to receive firm trade enrichment data from the first clearing participant 105 via an API provided by the clearinghouse server 110. In another embodiment, the trading link module 155 may be configured to receive firm trade enrichment data from the second clearing participant 115 via a web GUI 120. The trading link module 155 may further be configured to transmit the firm trade enrichment data to the clearing module 160.

The first clearing participant 105 may comprise a computing device that comprises a trade rapture module 125. The trade capture module may be embodied in instructions stored on a non-transitory memory of the computing device of the first clearing participant 105. The trade capture module 125 may be configured to receive firm trade data and firm trade enrichment request from the clearinghouse server 110. The trade capture module 125 may further be configured to automatically provide the firm trade enrichment data to the clearinghouse server 110 via an API associated with the clearinghouse server 110.

The second clearing participant 115 may comprise a computing device that is configured to execute instructions stored on a non-transitory memory. Execution of these instructions may cause that computing device to display a GUI 120. The GUI 120 may be configured to display the firm trade data. In one embodiment, the GUI 120 may be configured to display the firm trade counterparty information. In another embodiment, the GUI 120 may display the clearinghouse as the firm trade counterparty. The second clearing participant 115 may comprise a computing device configured to receive firm trade data and firm trade enrichment request from the clearinghouse server 110. The GUI 120 may be configured to display the firm trade enrichment request and to receive the firm trade enrichment data. The second clearing participant 115 may comprise a computing device configured to transmit the firm trade enrichment data to the clearinghouse server 110.

The first dealer 130 may comprise an account associated with the first clearing participant 105. The first dealer 130 may be configured to receive data associated with the first clearing participant 105 as a part of processing the firm trade as a cleared trade. The second dealer 140 may comprise an account associated with the second clearing participant 115. The second dealer 140 may be configured to receive data associated with the second clearing participant 115 as a part of processing the firm trade as a cleared trade.

The trade reporting repository 150 may be configured to receive the submission associated with the firm trade, once the firm trade is processed as a cleared trade. In one embodiment, the trade reporting repository 150 may be configured to receive the firm trade data via Automated New Trade submission process.

In one embodiment, the trade processing system 100 may operate in the following manner to process trades. The clearing module 160 may be configured to generate a firm trade between clearing participants counterparties 105 and 115. The clearing module 160 may then request firm trade enrichment data 180. The trading link modulo 155 may then request firm trade enrichment data 181*a* from the first clearing participant 105. The trading link module 155 may also request firm trade enrichment data 181*b* from the second clearing participant 115.

The first clearing participant 105 may then provide firm trade enrichment data 182*a*, via an API using the trade capture module 125. The second clearing participant 115 may provide firm trade enrichment data 182*b* via a GUI 120. The firm trade enrichment data may then be transmitted 183 to the clearing module 160. The clearing module 160 may be configured to process the firm trade as a cleared trade by sending appropriate messages 184*a* and 184*b* to the first dealer 130 and the second dealer 140. The clearing module 160 may be configured to process the firm trade with each of the clearing participants 105 and 115 facing the clearinghouse directly as respective counterparties. The clearing module 160 may also be configured to submit the cleared firm trade 185 to the trade reporting repository 150.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. An automated computer implemented method for trade processing, comprising:

receiving, by a server, a hypothetical trade from a first participant computing device, the server comprising memory and a processor configured to implement a trading link module and a clearing module, the hypothetical trade comprising a first type that is incompatible with processing by the clearing module of the server;

converting, by the server, the hypothetical trade into a firm trade by identifying a second participant computing device as a counterparty to the hypothetical trade, the firm trade also comprising the first type, wherein one device of the first participant computing device and the second participant computing device comprises an application programming interface (API) provided by and associated with the server, and a remaining device of the first participant computing device and the second participant computing device comprises an interactive graphical user interface (GUI);

identifying, by the trading link module of the server, the one device as comprising the API associated with the server, and the remaining device as failing to include the API associated with the server;

responsive to identifying that the one device comprises the API associated with the server:

automatically transmitting, by the trading link module, a data request to the one device via the API associated with the server, such that the data request is automatically received and processed by the API associated with the server, automatically receiving, by the trading link module, from a trade capture module of the one device via the API, participant specific data corresponding to one of a first participant and a second participant associated with the one device, responsive to the data request, and transmitting, by the trading link module, the participant specific data to the clearing module;

responsive to identifying that the remaining device fails to include the API associated with the server:
automatically transmitting, by the trading link module of the server, a further data request to the remaining device such that the further data request is configured to be displayed on the interactive GUI of the remaining device, the further data request comprising a prompt to enter further participant specific data corresponding to a remaining one of the first participant and the second participant associated with the remaining device, receiving, by the trading link module, the further participant specific data input to the interactive GUI from the remaining device, and transmitting, by the trading link module, the further participant specific data to the clearing module;

converting, by the clearing module, the firm trade to an enriched firm trade by appending the received participant specific data and the received further participant specific data to the firm trade;

converting, by the clearing module, the enriched firm trade to a cleared trade of a second type that is compatible with processing by the clearing module by:

processing a first portion of the enriched firm trade with a first account associated with the first participant based on account identification data in one of the participant specific data and the further participant specific data, the first participant associated with the first participant computing device, and processing a second portion of the enriched firm trade with a second account associated with the second participant based on account identification data in a remaining one of the participant specific data and the further participant specific data, the second participant associated with the second participant computing device;

processing, by the clearing module, the cleared trade; and submitting the cleared trade to a trade reporting repository.

2. The method of claim 1, wherein the converting the hypothetical trade to the firm trade further comprises a price discovery process in which theoretical bids and offers are crossed and locked.

3. The method of claim 2, wherein the price discovery process further comprises:

generating, by the clearing module, a representative price based on the hypothetical trade; and determining, by the clearing module, a price of the firm trade based on the representative price.

4. The method of claim 1, wherein the enriched firm trade is straight-through processed (STP'ed) to at least one of the first participant computing device and the second participant computing device.

5. The method of claim 1, wherein the server comprises a clearinghouse entity configured to process the enriched firm trade as the cleared trade between the first participant computing device, the second participant computing device, and the clearinghouse entity directly as a respective counterparty.

6. The method of claim 5, wherein the enriched firm trade is not processed as a bilateral trade.

7. The method of claim 5, wherein the enriched firm trade is considered null and void if the clearinghouse entity rejects the enriched firm trade.

8. The method of claim 1, further comprising:

receiving, by the clearing module, one or more trade submissions from one or more clearing participant systems via one or more participant computing devices to generate the firm trade; and comparing, by the clearing module, the received one or more trade submissions from among the one or more clearing participant systems to create the hypothetical trade.

9. The method of claim 1, further comprising:

when the trading link module does not receive the further participant specific data from the remaining device via the interactive GUI within a predetermined time period:

automatically generating, by the clearing module, without any input from the remaining device, enriching data using default values for the remaining one of the first participant and the second participant associated with the remaining device, and further converting, by the clearing module, the firm trade to the enriched firm trade by appending the enriching data to the firm trade.

10. A clearinghouse server comprising:

one or more processors executing computer-readable instructions embodied in a non-transient computer readable medium, the one or more processors configured to implement a trading link module and a clearing module, the computer-readable instructions, when executed, causing the clearinghouse server to:

receive a hypothetical trade from a first participant computing device, the hypothetical trade comprising a first type that is incompatible with processing by the clearing module of the clearinghouse server;

convert the hypothetical trade into a firm trade by identifying a second participant computing device as a counterparty to the hypothetical trade, the firm trade also comprising the first type, wherein one device of the first participant computing device and the second participant computing device comprises an application programming interface (API) provided by and associated with the clearinghouse server, and a remaining device of the first participant computing device and the second participant computing device comprises an interactive graphical user interface (GUI);

identify, by the trading link module of the clearinghouse server, the one device as comprising the API associated with the clearinghouse server, and the remaining device as failing to include the API associated with the clearinghouse server;

responsive to identifying that the one device comprises the API associated with the clearinghouse server:

automatically transmit, by the trading link module, a data request to the one device via the API associated with the clearinghouse server, such that the data request is automatically received and processed by the API associated with the clearinghouse server, automatically receive, by the trading link module, from a trade capture module of the one device via the API, participant specific data corresponding to one of a first participant and a second participant associated with the one device, responsive to the data request, and transmit, by the trading link module, the participant specific data to the clearing module;

responsive to identifying that the remaining device fails to include the API associated with the clearinghouse server:

automatically transmit, by the trading link module of the clearinghouse server, a further data request to the remaining device such that the further data request is configured to be displayed on the interactive GUI of the remaining device, the further data request comprising a prompt to enter further participant specific data corresponding to a remaining one of the first participant and the second participant associated with the remaining device, receive, by the trading link module, the further participant specific data input to the interactive GUI from the remaining device, and transmit, by the trading link module, the further participant specific data to the clearing module;

convert, by the clearing module, the firm trade to an enriched firm trade by appending the received participant specific data and the received further participant specific data to the firm trade;

convert, by the clearing module, the enriched firm trade to a cleared trade of a second type that is compatible with processing by the clearing module by:

processing a first portion of the enriched firm trade with a first account associated with the first participant based on account identification data in one of the participant specific data and the further participant specific data, the first participant associated with the first participant computing device, and processing a second portion of the enriched firm trade with a second account associated with the second participant based on account identification data in a remaining one of the participant specific data and the further participant specific data, the second participant associated with the second participant computing device;

process, by the clearing module, the cleared trade; and submit the cleared trade to a trade reporting repository.

11. The clearinghouse server of claim 10, wherein the clearing module converts the hypothetical trade to the firm trade by executing a price discovery process in which theoretical bids and offers are crossed and locked.

12. The clearinghouse server of claim 11, wherein the price discovery process includes functions, executed by the clearing module, that cause the clearinghouse server to:

generate a representative price based on the hypothetical trade; and determine a price of the firm trade based on the representative price.

13. The clearinghouse server of claim 10, wherein the clearing module is further configured to straight-through process (STP) the enriched firm trade to at least one of the first participant computing device and the second participant computing device.

14. The clearinghouse server of claim 10, wherein the clearing module is further configured to process the enriched firm trade as the cleared trade between the first participant computing device, the second participant computing device, and the clearinghouse server directly as a respective counterparty.

15. The clearinghouse server of claim 14, wherein the interactive GUI is further configured to display additional firm trade data, said additional firm trade data indicating that one of the first participant and the second participant and the clearinghouse server are respective trade counterparties.

16. The clearinghouse server of claim 14, wherein the clearing module is further configured to avoid processing the enriched firm trade as a bilateral trade.

17. The clearinghouse server of claim 14, wherein the enriched firm trade is considered null and void if the clearinghouse server rejects the firm trade.

18. The clearinghouse server of claim 10, wherein the clearing module is further configured to:

receive one or more trade submissions from one or more clearing participant systems via one or more participant computing devices to generate the firm trade; and compare the received one or more trade submissions from among the one or more clearing participant systems to create the hypothetical trade.

19. The clearinghouse server of claim 10, wherein when the trading link module does not receive the further participant specific data from the remaining device via the interactive GUI within a predetermined time period, the clearing module is further configured to:

automatically generate without any input from the remaining device, enriching data using default values for the remaining one of the first participant and the second participant associated with the remaining device, and further convert the firm trade to the enriched firm trade by appending the enriching data to the firm trade.

\* \* \* \* \*